(12) United States Patent  
Freitag et al.

(10) Patent No.: US 9,318,133 B2  
(45) Date of Patent: Apr. 19, 2016

(54) RECESSED ANTIFERROMAGNETIC DESIGN WITH ANTIPARALLEL PINNED STITCH LAYERS FOR IMPROVED PINNING FIELD

(71) Applicant: HGST Netherlands B.V., Amsterdam (NL)

(72) Inventors: James M. Freitag, Sunnyvale, CA (US); Zheng Gao, San Jose, CA (US); Chando Park, Palo Alto, CA (US)

(73) Assignee: HGST Netherlands B.V., Amsterdam (NL)

( * ) Notice: Subject to any disclaimer, the term of this patent is extended or adjusted under 35 U.S.C. 154(b) by 66 days.

(21) Appl. No.: 14/139,762

(22) Filed: Dec. 23, 2013

(65) Prior Publication Data

US 2015/0179195 A1 Jun. 25, 2015

(51) Int. Cl.
*G11B 5/39* (2006.01)
*G11B 5/31* (2006.01)

(52) U.S. Cl.
CPC ............ *G11B 5/3909* (2013.01); *G11B 5/3906* (2013.01); *G11B 5/3932* (2013.01); *G11B 5/3163* (2013.01); *G11B 2005/3996* (2013.01); *Y10T 428/1193* (2015.01)

(58) Field of Classification Search
CPC ...... G11B 5/39; G11B 5/3903; G11B 5/3929; G11B 5/3932; G11B 5/3906
USPC .................. 360/324.1, 324.11, 324.12, 324.2
See application file for complete search history.

(56) References Cited

U.S. PATENT DOCUMENTS

| | | | |
|---|---|---|---|
| 6,741,432 B2 | 5/2004 | Pinarbasi | |
| 6,842,316 B2 | 1/2005 | Gill | |
| 7,092,221 B2 | 8/2006 | Gill | |
| 7,180,716 B2* | 2/2007 | Li et al. | 360/324.12 |
| 7,369,371 B2 | 5/2008 | Freitag et al. | |
| 7,602,589 B2 | 10/2009 | Freitag et al. | |
| 7,961,440 B2 | 6/2011 | Gill et al. | |
| 8,068,317 B2 | 11/2011 | Gill | |
| 8,711,528 B1* | 4/2014 | Xiao et al. | 360/324.11 |
| 9,001,473 B1* | 4/2015 | Gao et al. | 360/324.11 |
| 9,007,729 B1* | 4/2015 | Ho et al. | 360/324.11 |
| 9,030,785 B2 | 5/2015 | Freitag et al. | |
| 2012/0276415 A1 | 11/2012 | Sapozhnikov et al. | |
| 2012/0320473 A1 | 12/2012 | Okamura et al. | |
| 2014/0004386 A1* | 1/2014 | Covington | G11B 5/3932 428/816 |
| 2014/0377589 A1* | 12/2014 | Freitag | G11B 5/3143 428/812 |
| 2015/0062751 A1* | 3/2015 | Le | G11B 5/3146 360/234.3 |
| 2015/0062752 A1* | 3/2015 | Hong | H01L 43/02 360/234.3 |
| 2015/0221328 A1* | 8/2015 | Le | G11B 5/3932 360/324.12 |

OTHER PUBLICATIONS

U.S. Appl. No. 13/923,624, filed Jun. 21, 2013.
Hoshino, K. et al., "Applying Amorphous CoNbZr Shield to Improve the Dielectric-Breakdown Voltage of the Gap Layers of Narrow-Gap Read Heads," IEEE Transactions on Magnetics, vol. 39, No. 5, Sep. 2003, pp. 2393-2395.

* cited by examiner

*Primary Examiner* — Jefferson Evans
(74) *Attorney, Agent, or Firm* — Zilka-Kotab, PC

(57) ABSTRACT

In one general embodiment, a device includes an antiferromagnetic layer; a first stitch layer exchange coupled with the antiferromagnetic layer, the first stitch layer having a magnetic orientation substantially parallel to a magnetic orientation of the antiferromagnetic layer; a second stitch layer exchange coupled with the first stitch layer and having a magnetic orientation substantially antiparallel to the magnetic orientation of the first stitch layer; a pinned layer structure exchange coupled with the second stitch layer; a free layer; and a spacer layer between the free layer and the pinned layer structure. An end of the antiferromagnetic layer facing a sensing face of the device is recessed from the sensing face.

17 Claims, 11 Drawing Sheets

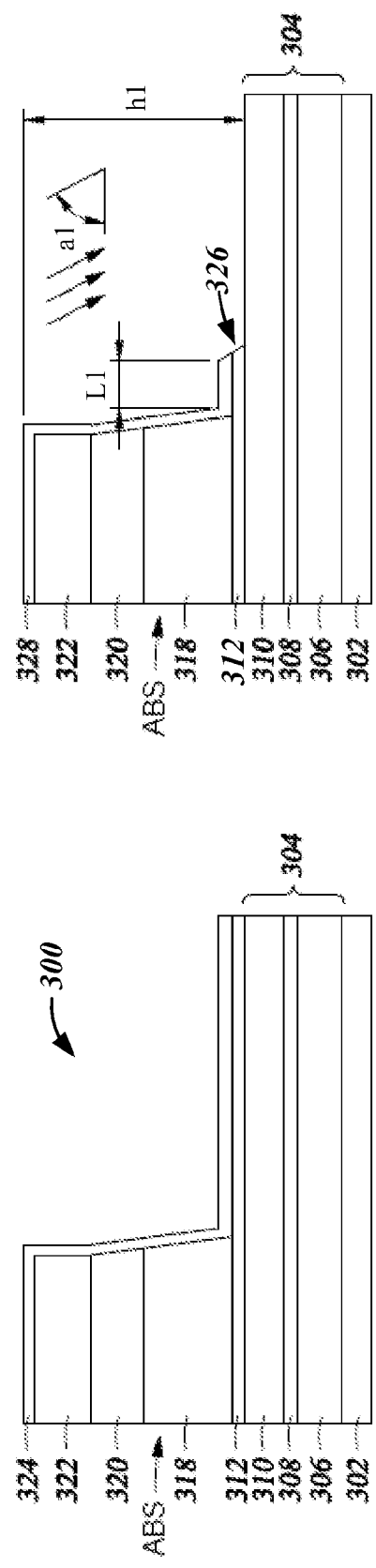

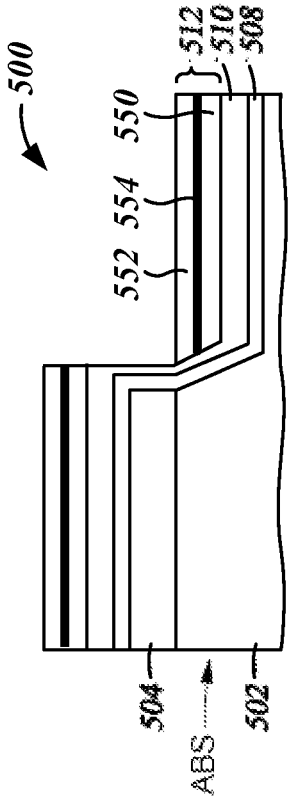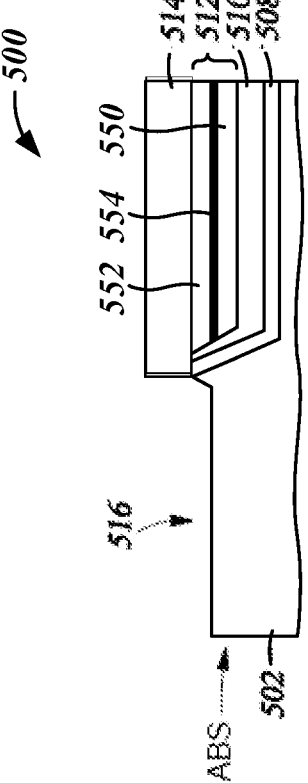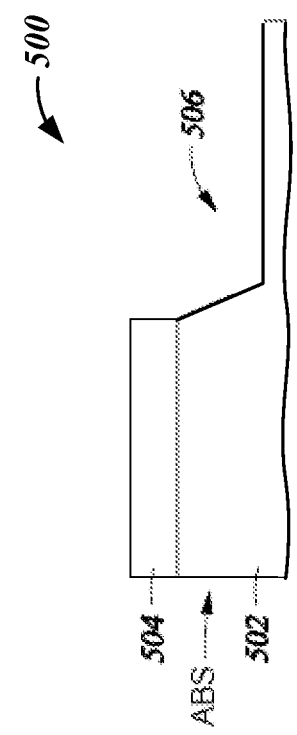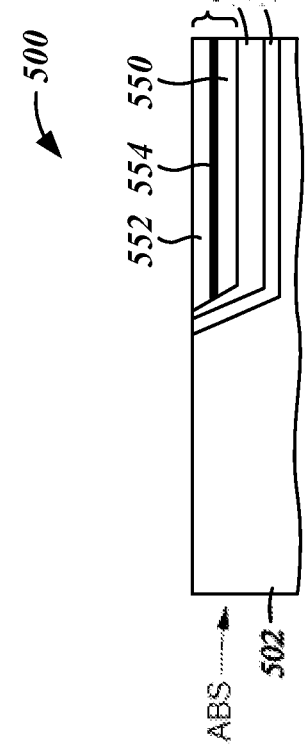
Fig. 5A
Fig. 5B
Fig. 5C
Fig. 5D

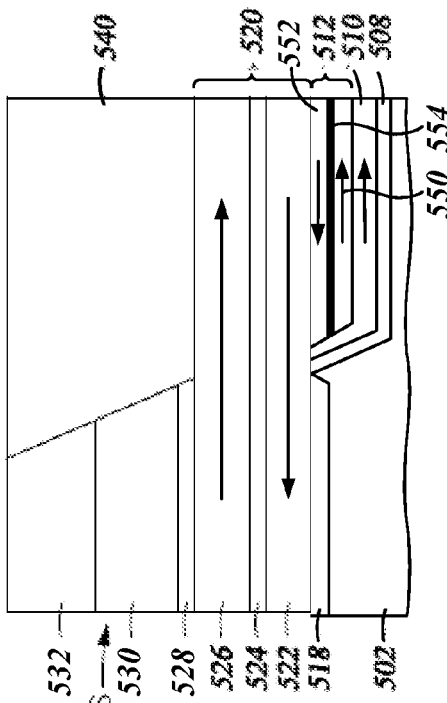
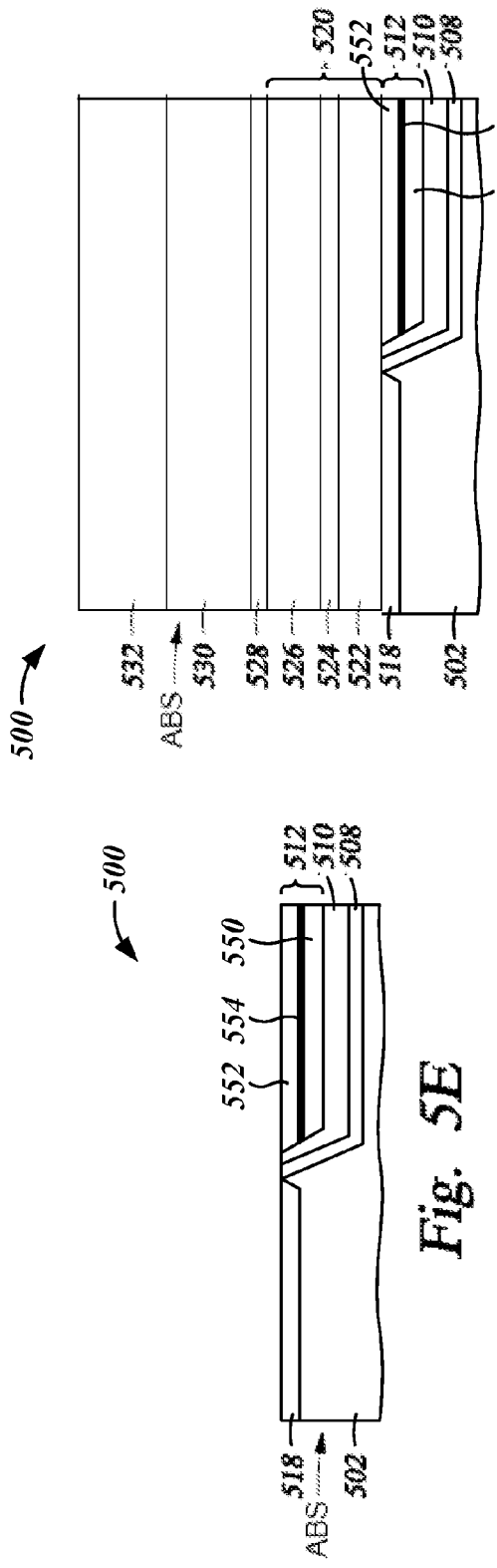
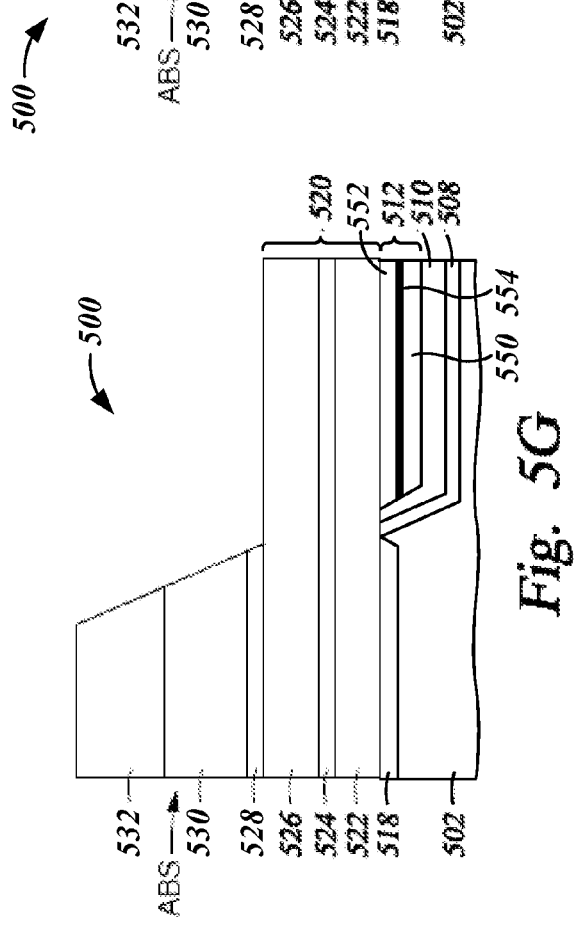
Fig. 5E
Fig. 5F
Fig. 5G
Fig. 5H

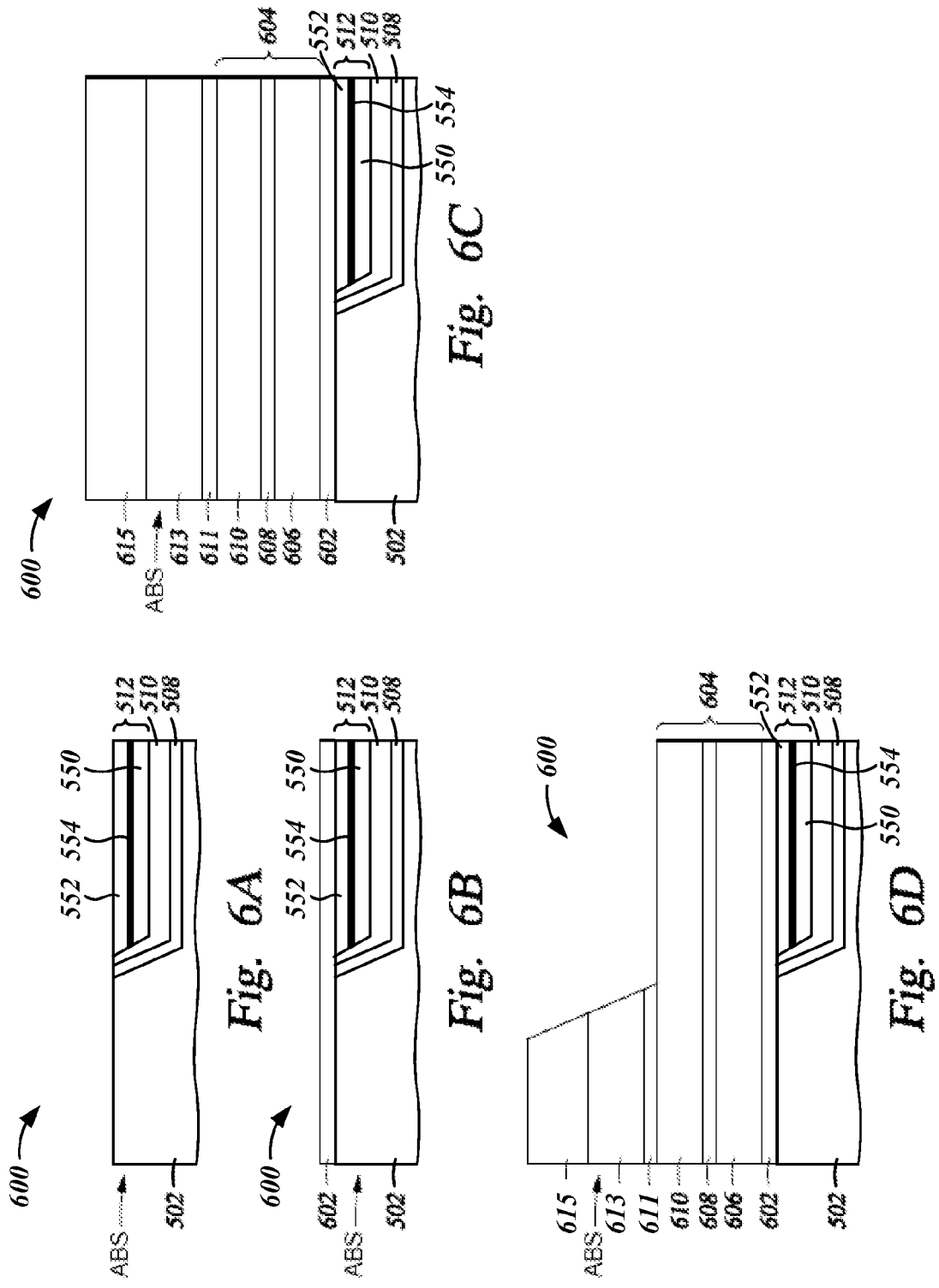

RECESSED ANTIFERROMAGNETIC DESIGN WITH ANTIPARALLEL PINNED STITCH LAYERS FOR IMPROVED PINNING FIELD

FIELD OF THE INVENTION

The present invention relates to data storage systems, and more particularly, this invention relates to magnetic read head having antiparallel pinned stitch layers for improved pinning field strength.

BACKGROUND

The heart of a computer is a magnetic hard disk drive (HDD) which typically includes a rotating magnetic disk, a slider that has read and write heads, a suspension arm above the rotating disk and an actuator arm that swings the suspension arm to place the read and/or write heads over selected circular tracks on the rotating disk. The suspension arm biases the slider into contact with the surface of the disk when the disk is not rotating but, when the disk rotates, air is swirled by the rotating disk adjacent an air bearing surface (ABS) of the slider causing the slider to ride on an air bearing a slight distance from the surface of the rotating disk. When the slider rides on the air bearing the write and read heads are employed for writing magnetic impressions to and reading magnetic signal fields from the rotating disk. The read and write heads are connected to processing circuitry that operates according to a computer program to implement the writing and reading functions.

The read head typically utilizes a spin valve sensor, also referred to as a giant magnetoresistive (GMR) sensor. The sensor at the ABS typically includes a barrier layer sandwiched between a pinned layer and a free layer, and an antiferromagnetic layer for pinning the magnetization of the pinned layer. The magnetization of the pinned layer is pinned perpendicular to the ABS and the magnetic moment of the free layer is located parallel to the ABS, but free to rotate in response to external magnetic fields.

The volume of information processing in the information age is increasing rapidly. In particular, it is desired that HDDs be able to store more information in their limited area and volume. A technical approach to this desire is to increase the capacity by increasing the recording density of the HDD.

To achieve higher recording density, further miniaturization of recording bits is effective, which in turn typically requires the design of smaller and smaller components. The further miniaturization of the various components, however, presents its own set of challenges and obstacles.

The need for increasing the recording density of the HDD is pushing researchers to develop data recording systems that can read and record progressively smaller bit lengths in order to increase the density of data recorded on a magnetic medium. This has led to a push to decrease the gap thickness of a read head such as a GMR head. However, the amount by which such gap thickness can be decreased has been limited by physical limitations of sensors and also by the limitations of currently available manufacturing methods.

A self-pinned sensor in which the antiferromagnetic layer is reduced in thickness or removed completely so as to not provide a pinning field for the pinned layer structure provides a method to reduce the read gap thickness. However, the self-pinned sensor is sensitive to magnetic disturbances caused, for instance, by a head-media impact, which may flip the magnetic orientation of the free layer, thereby reversing the polarity of the amplitude of the output signal from the read head, often rendering the device useless.

Therefore, there is a need for an improved magnetic head and method of manufacture that enabling reduction of the read gap thickness while preserving the reliability of the magnetic head.

SUMMARY

A device according to one embodiment includes an antiferromagnetic layer; a first stitch layer exchange coupled with the antiferromagnetic layer, the first stitch layer having a magnetic orientation substantially parallel to a magnetic orientation of the antiferromagnetic layer; a second stitch layer exchange coupled with the first stitch layer and having a magnetic orientation substantially antiparallel to the magnetic orientation of the first stitch layer; a pinned layer structure exchange coupled with the second stitch layer; a free layer; and a spacer layer between the free layer and the pinned layer structure. An end of the antiferromagnetic layer facing a sensing face of the device is recessed from the sensing face.

A device according to another embodiment includes an antiferromagnetic layer; a first stitch layer exchange coupled with the antiferromagnetic layer, the first stitch layer having a magnetic orientation substantially parallel to a magnetic orientation of the antiferromagnetic layer; a second stitch layer exchange coupled with the first stitch layer and having a magnetic orientation substantially antiparallel to the magnetic orientation of the first stitch layer; a pinned layer structure, a portion of the pinned layer being exchange coupled with the second stitch layer, wherein a magnetic orientation of the portion of the pinned layer is substantially parallel with the magnetic orientation of the second stitch layer; a free layer; and a spacer layer between the free layer and the pinned layer structure. An end of the antiferromagnetic layer facing a sensing face of the device is recessed from the sensing face. Ends of the stitch layers facing the sensing face of the device are recessed from the sensing face.

Any of these embodiments may be implemented in a magnetic data storage system such as a disk drive system, which may include a magnetic head, a drive mechanism for passing a magnetic medium (e.g., hard disk) over the magnetic head, and a controller electrically coupled to the magnetic head.

Other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

FIGS. 3A-3F are process steps for making a magnetic read head according to one embodiment.

FIGS. 5A-5H are process steps for making a magnetic read head according to one embodiment.

FIGS. 6A-6E are process steps for making a magnetic read head according to one embodiment.

DETAILED DESCRIPTION

Figure 1:
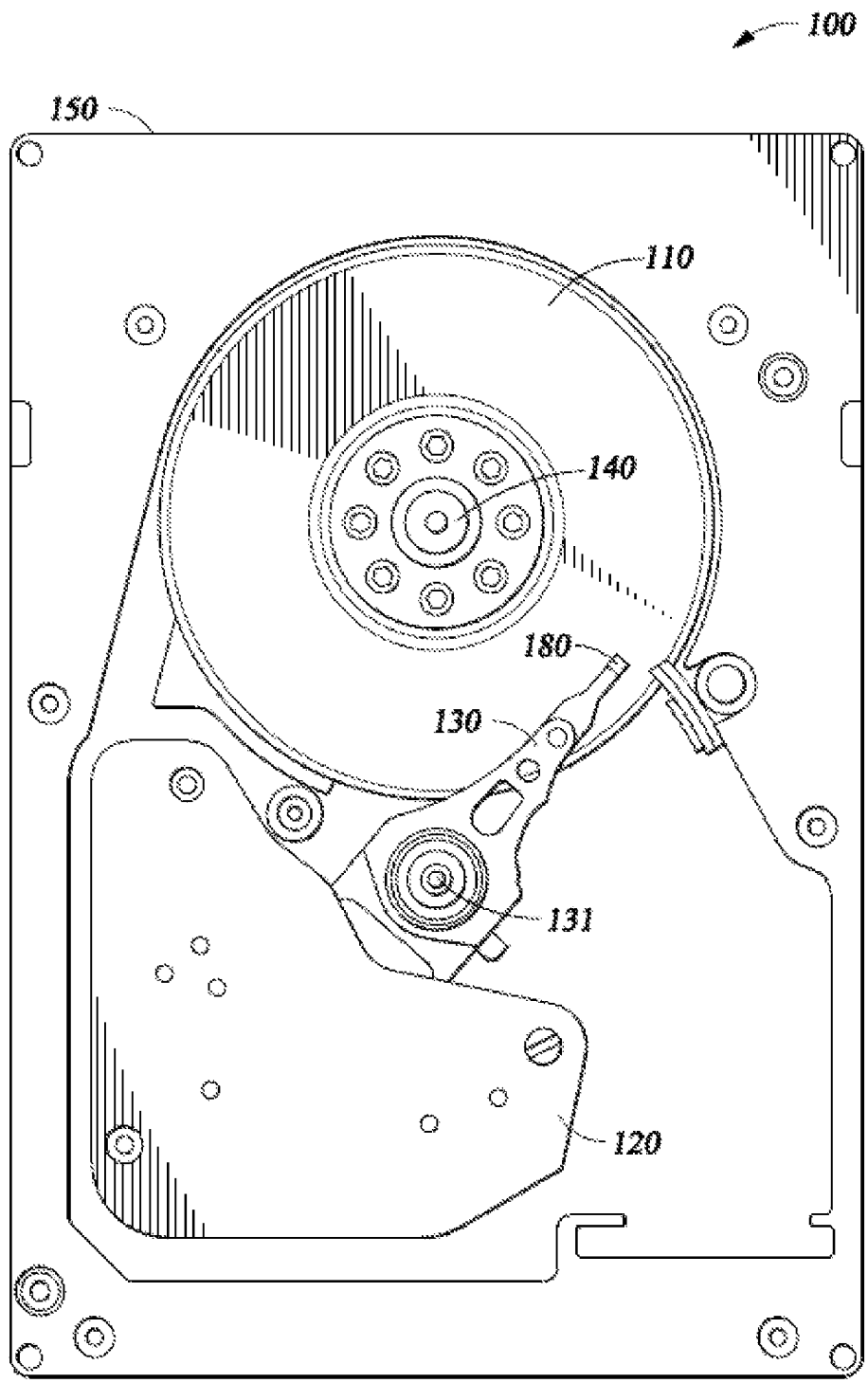
FIG. 1 is an exemplary magnetic disk drive, according to one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of disk-based storage systems and/or related systems and methods, as well as operation and/or component parts thereof. Various embodiments described herein may include a magnetic read head having a multilayer stitch layer structure and an antiferromagnetic layer which are recessed in relation to the ABS of the read head. The recessed layers may be disposed above or below the pinned layer structure and provide improved pinning field strength by reducing damage caused during formation thereof as will be described in further detail below. Additionally, the read gap of the sensor, that is the distance between the highly permeable, magnetically soft upper and lower shield layers at the ABS, may be reduced in the embodiments described herein.

In one general embodiment, a device includes an antiferromagnetic layer; a first stitch layer exchange coupled with the antiferromagnetic layer, the first stitch layer having a magnetic orientation substantially parallel to a magnetic orientation of the antiferromagnetic layer; a second stitch layer exchange coupled with the first stitch layer and having a magnetic orientation substantially antiparallel to the magnetic orientation of the first stitch layer; a pinned layer structure exchange coupled with the second stitch layer; a free layer; and a spacer layer between the free layer and the pinned layer structure. An end of the antiferromagnetic layer facing a sensing face of the device is recessed from the sensing face.

In another general embodiment, a device includes an antiferromagnetic layer; a first stitch layer exchange coupled with the antiferromagnetic layer, the first stitch layer having a magnetic orientation substantially parallel to a magnetic orientation of the antiferromagnetic layer; a second stitch layer exchange coupled with the first stitch layer and having a magnetic orientation substantially antiparallel to the magnetic orientation of the first stitch layer; a pinned layer structure, a portion of the pinned layer being exchange coupled with the second stitch layer, wherein a magnetic orientation of the portion of the pinned layer is substantially parallel with the magnetic orientation of the second stitch layer; a free layer; and a spacer layer between the free layer and the pinned layer structure. An end of the antiferromagnetic layer facing a sensing face of the device is recessed from the sensing face. Ends of the stitch layers facing the sensing face of the device are recessed from the sensing face.

FIG. 1 illustrates a top view of an exemplary HDD 100, according to an embodiment of the invention. As illustrated, the HDD 100 may include one or more magnetic disks 110, actuator 120, actuator arms 130 associated with each of the magnetic disks 110, and spindle motor 140 affixed in a chassis 150. The one or more magnetic disks 110 may be arranged vertically as illustrated in FIG. 1. Moreover, the one or more magnetic disks may be coupled with the spindle motor 140 and rotated thereby, e.g., over the magnetic head 180.

Magnetic disks 110 may include circular tracks of data on both the top and bottom surfaces of the disk. A magnetic head 180 mounted on a slider may be positioned on a track. As each disk spins, data may be written on and/or read from the data track. Magnetic head 180 may be coupled to an actuator arm 130 as illustrated in FIG. 1. Actuator arm 130 may be configured to swivel around actuator axis 131 to place magnetic head 180 on a particular data track.

According to various approaches, the actuator 120 as shown in FIG. 1 may be a voice coil motor (VCM). A VCM may typically have a coil movable within a fixed magnetic field, the direction and speed of the coil movements being controlled by the motor current signals which may be supplied by a controller.

The various components of the disk storage system may be controlled in operation by control signals generated by a controller, such as access control signals, internal clock signals, etc. Typically, a controller may include a control unit which has logic control circuits, storage (e.g., memory), and a microprocessor. In a preferred approach, a control unit is electrically coupled (e.g., via wire, cable, line, etc.) to the magnetic head 180, for controlling operation thereof. A control unit may generate control signals to control various system operations such as drive motor control signals, magnetic head position, seek control signals etc.

Figure 2:
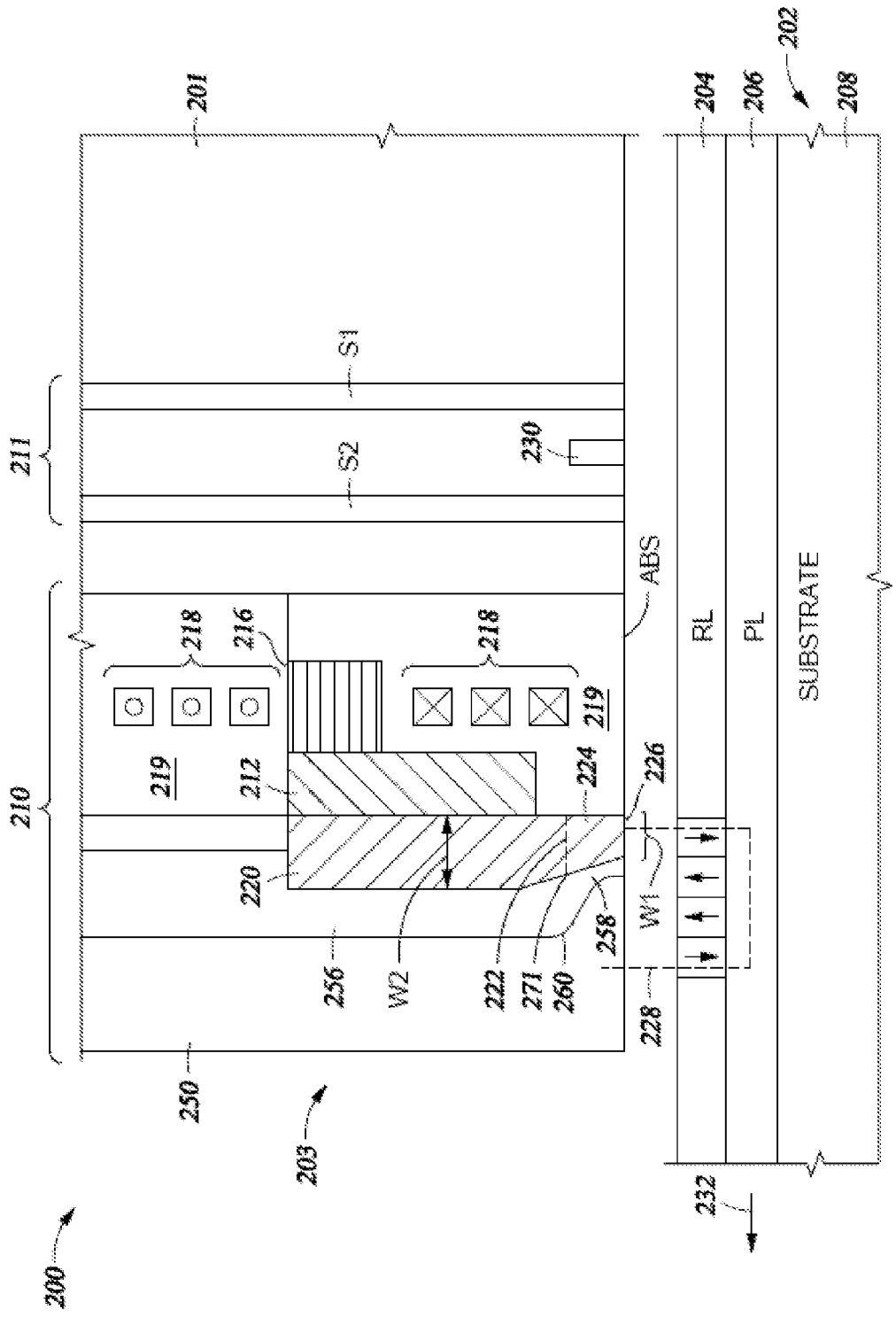
FIG. 2 is a side view of a read/write head and magnetic disk of the disk drive of FIG. 1, according to one embodiment.

FIG. 2 is a fragmented, cross-sectional side view through the center of a read/write head 200 mounted on a slider 201 and facing magnetic disk 202. The read/write head 200 and magnetic disk 202 may correspond to the magnetic head 180 and magnetic disk 110, respectively in FIG. 1. In some embodiments, the magnetic disk 202 may be a "dual-layer" medium that includes a perpendicular magnetic data recording layer (RL) 204 on a "soft" or relatively low-coercivity magnetically permeable underlayer (PL) 206 formed on a disk substrate 208. The read/write head 200 includes an ABS, a magnetic write head 210 and a magnetic read head 211, and is mounted such that the ABS is facing the magnetic disk 202. In FIG. 2, the disk 202 moves past the write head 210 in the direction indicated by the arrow 232, so the portion of slider 201 that supports the read/write head 200 is often called the slider "trailing" end 203.

The magnetic read head 211 is a MR read head that includes a MR sensing element 230 located between MR shields S1 and S2, which are composed of a highly permeable and magnetically soft material such as permalloy. The distance between S1 and S2, which is the sensor thickness, defines the read gap of the read head. The RL 204 is illustrated with perpendicularly recorded or magnetized regions, with adjacent regions having magnetization directions, as represented by the arrows located in the RL 204. The magnetic fields of the adjacent magnetized regions are detectable by the MR sensing element 230 as the recorded bits.

The write head 210 includes a magnetic circuit made up of a main pole 212 and a yoke 216. The write head 210 also includes a thin film coil 218 shown in the section embedded in non-magnetic material 219 and wrapped around yoke 216. In an alternative embodiment, the yoke 216 may be omitted, and the coil 218 may wrap around the main pole 212. A write pole 220 is magnetically connected to the main pole 212 and has an end 226 that defines part of the ABS of the magnetic write head 210 facing the outer surface of disk 202.

Write pole 220 is a flared write pole and includes a flare point 222 and a pole tip 224 that includes an end 226 that defines part of the ABS. The flare may extend the entire height of write pole 220 (i.e., from the end 226 of the write pole 220 to the top of the write pole 220), or may only extend from the flare point 222, as shown in FIG. 2. In one embodiment the distance between the flare point 222 and the ABS is between about 30 nm and about 150 nm.

The write pole 220 includes a tapered surface 271 which increases a width of the write pole 220 from a first width W1 at the ABS to a second width W2 away from the ABS. In one embodiment, the width W1 may be between around 60 nm and 200 nm, and the width W2 may be between around 120 nm and 350 nm. While the tapered region 271 is shown with a single straight surface in FIG. 2, in alternative embodiment, the tapered region 271 may include a plurality of tapered surface with different taper angles with respect to the ABS.

The tapering improves magnetic performance. For example, reducing the width W1 at the ABS may concentrate a magnetic field generated by the write pole 220 over desirable portions of the magnetic disk 202. In other words, reducing the width W1 of the write pole 220 at the ABS reduces the probability that tracks adjacent to a desirable track are erroneously altered during writing operations.

While a small width of the write pole 220 is desired at the ABS, it may be desirable to have a greater width of the write pole 220 in areas away from the ABS. A larger width W2 of the write pole 220 away from the ABS may desirably increase the magnetic flux to the write pole 220, by providing a greater thickness of the write pole 220 in a direction generally parallel to the ABS. In operation, write current passes through coil 218 and induces a magnetic field (shown by dashed line 228) from the write pole 220 that passes through the RL 204 (to magnetize the region of the RL 204 beneath the write pole 220), through the flux return path provided by the PL 206, and back to an upper return pole 250. In one embodiment, the greater the magnetic flux of the write pole 220, the greater is the probability of accurately writing to desirable regions of the RL 204.

FIG. 2 further illustrates one embodiment of the upper return pole or magnetic shield 250 that is separated from write pole 220 by a nonmagnetic gap layer 256. In some embodiments, the magnetic shield 250 may be a trailing shield wherein substantially all of the shield material is on the trailing end 203. Alternatively, in some embodiments, the magnetic shield 250 may be a wrap-around shield wherein the shield covers the trailing end 203 and also wraps around the sides of the write pole 220. As FIG. 2 is a cross section through the center of the read/write head 200, it represents both trailing and wrap-around embodiments.

Near the ABS, the nonmagnetic gap layer 256 has a reduced thickness and forms a shield gap throat 258. The throat gap width is generally defined as the distance between the write pole 220 and the magnetic shield 250 at the ABS. The shield 250 is formed of magnetically permeable material (such as Ni, Co and Fe alloys) and gap layer 256 is formed of nonmagnetic material (such as Ta, TaO, Ru, Rh, NiCr, SiC or Al2O3). A taper 260 in the gap material provides a gradual transition from the throat gap width at the ABS to a maximum gap width above the taper 260. This gradual transition in width forms a tapered bump in the non-magnetic gap layer that allows for greater magnetic flux density from the write pole 220, while avoiding saturation of the shield 250.

It should be understood that the taper 260 may extend either more or less than is shown in FIG. 2. The taper may extend upwards to an end of shield 250 opposite the ABS (not shown), such that the maximum gap width is at the end of the shield opposite the ABS. The gap layer thickness increases from a first thickness (the throat gap width) at the ABS to greater thicknesses at a first distance from the ABS, to a final thickness at a second distance (greater than the first distance) from the ABS.

As described above, conventional products include self-pinned read heads without an antiferromagnetic layer present. However, without an antiferromagnetic layer, the magnetic orientation of the self-pinned layers are susceptible to flipping during use, as their pinning field strength is weak. Such flipping results in read errors, unreliability, inability to read data altogether, etc. which is undesirable. Other conventional products may include a sensor stack having an antiferromagnetic layer which extends to the ABS in an attempt to reduce this magnetic flipping. However, the antiferromagnetic layer at the ABS contributes to the total thickness of the read gap, thereby decreasing read accuracy, increasing read errors, etc. Furthermore, the antiferromagnetic layer in conventional products is susceptible to damage during formation thereof as the harmful effects of the milling process extend below the level at which the milling is being performed. Thus, as the layers above the antiferromagnetic layer in conventional products are milled, damage resulting from the milling process reaches the antiferromagnetic layer, thereby weakening the pinning field strength of the antiferromagnetic layer, and increasing the probability that the magnetic orientation of the pinned layers will flip during use.

In sharp contrast, various embodiments described herein include an improved magnetic read head having an antiferromagnetic layer that is recessed from the ABS in the stripe height direction normal to the ABS, in addition to a multilayer stitch layer structure. Consequently, the read gap thickness is reduced and the pinning field strength is increased, thereby improving sensor performance and overcoming the problems experienced with conventional products.

FIGS. 3A-3F illustrate a process for making a device 300, e.g., portions of the magnetic read head 211 of FIG. 2, according to one embodiment. However, according to other embodiments, the device 300 and/or other devices described herein may include a biological sensor, magnetoresistive random-access memory (MRAM), etc. As an option, the present device 300 may be implemented in conjunction with features from any other embodiment listed herein, such as those described with reference to the other Figures. Of course, however, such device 300 and others presented herein may be used in various applications and/or in permutations which may or may not be specifically described in the illustrative embodiments listed herein. Further, the device 300 presented herein may be used in any desired environment. Thus FIGS. 3A-3F (and the other Figures) should be deemed to include any and all possible permutations.

FIG. 3A is a partial cross-sectional side view of the device 300. The device 300 includes a sensor stack having a seed layer 302, a pinned layer structure 304, a nonmagnetic spacer layer 312, a free layer 314, and a capping layer 316 which extend to the (future) ABS, which is typically defined after the sensor stack is completed on the wafer.

The seed layer 302 may include a Ta, Ru, iridium-manganese, etc. or any other conductive material which would be apparent to one skilled in the art upon reading the present description. Moreover the seed layer 302 may be a single layer, or a multilayered structure, e.g., having more than one layer. In various approaches, the seed layer 302 may have a thickness $t_1$ of less than about 8 nanometers (nm), less than about 4 nm, such as 2 nm, which is less than the thickness of a seed layer in a sensor stack with an antiferromagnetic layer at the ABS.

As illustrated, the pinned layer structure 304 may include an antiparallel (AP) pinned structure having a first pinned layer 306, a second pinned layer 310, and an AP coupling layer 308 sandwiched between the two pinned layers 306, 310. However, in other approaches, the pinned layer structure 304 may be a single layer, at least two layers, at least three layers, multiple layers, etc. depending on the desired embodiment. In a preferred approach the coupling layer 308 may be nonmagnetic.

According to various approaches, the first and/or second pinned layers 306, 310 may be constructed of magnetic materials such as, for example NiFe, CoFe, CoFeB, Co, CoZr, CoHf, CoFeTaB, etc., and/or combinations thereof. It should be noted that in different embodiments, the first and second pinned layers 306, 310 may include the same, similar or different materials and/or dimensions. Moreover, the nonmagnetic layer 308 may include Ru, but is not limited thereto.

The spacer layer 312 is positioned between the free layer 314 and the pinned layer structure 304. According to various approaches, which is in no way intended to limit the invention, in a tunneling magnetoresistance (TMR) sensor, the pinned layer structure is a tunnel barrier layer of a type known in the art, e.g., of magnesium oxide, $TiO_2$, alumina or other known tunnel barrier material. In other embodiments, the spacer layer 312 may be a nonmagnetic metallic spacer layer, e.g., of Cu, Ag, AgSn, etc. Metallic spacer layers may be used, for example, in current perpendicular to plane (CPP) sensors such as GMR sensors, AMR sensors, etc.

In various approaches, the free layer 314 may include a ferromagnetic material such as Co, CoFe, CoFeB, NiFe, CoHf, etc. and/or combinations thereof. Furthermore, the capping layer 316 may be a single layer or a multilayered structure which may include a material such as Ru, Ta, etc., e.g., to protect the layers of the device 300 below the capping layer 316 from oxidation and other damage.

With continued reference to FIG. 3A, a mask layer 322, e.g., photoresist, is deposited over a portion of the capping layer 316, leaving a portion of the capping layer 316 away from the ABS exposed. Furthermore, looking to FIG. 3B, the exposed portion of the capping layer 316 and a portion of the free layer 314 not covered by the mask layer 322 are removed, thereby trimming the free layer 318 and capping layer 320 as illustrated. Additionally, a portion of the spacer layer 312 is exposed in the process. According to one approach, the removal of the capping layer 316 and portion of the free layer 314 not covered by the mask layer 322 may be performed by of one or more ion milling processes. Moreover, in a further approach, the side wall of the free layer 318 and the capping layer 320 opposite the ABS may be slightly non-vertical, as a result of the ion milling process.

As shown in FIG. 3C, an insulation layer 324 is conformally deposited over the mask layer 322, the exposed portion of the spacer layer 312 and the side walls of the mask layer 322, the capping layer 320 and the free layer 318, away from the ABS. According to different approaches, the insulation layer 324 may include an insulating material, e.g., MgO, alumina, etc., or any other material which would be apparent to one skilled in the art upon reading the present description. Chemical vapor deposition or other known process may be used to deposit the insulation layer 324.

Looking to FIG. 3D, a portion of the insulation layer 324 and a portion of the spacer layer 312 are removed to expose a portion of the pinned layer structure 304. According to an illustrative approach, the removal may be performed by an oblique angle static ion mill, e.g., at an angle "a1", as would be appreciated by one skilled in the art upon reading the present description. A remaining portion of the insulation layer 328 has a section having a length "L1" disposed over a remaining part of the spacer layer 326. According to a preferred approach, the length "L1" approximately equals the thickness "h1" divided by the tangent of "a1", where "a1" is the ion milling angle, but L1 could be higher or lower depending on the desired embodiment.

Figure 3E:
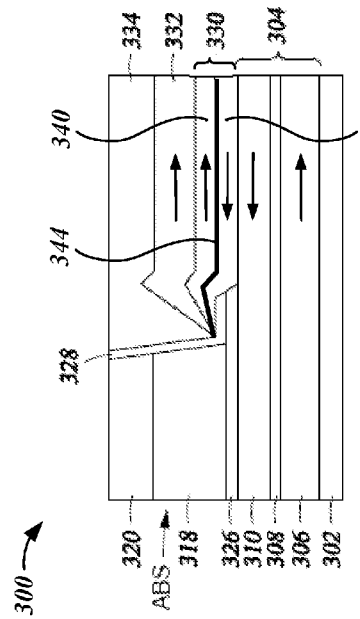

Referring now to FIG. 3E, a ferromagnetic stitch layer structure 330 is deposited over the remaining insulation layer 328, the exposed portion of the pinned layer structure 304, and the side wall of the remaining insulation layer 328 and the remaining spacer layer 326. The ferromagnetic stitch layer structure 330 is disposed adjacent the free layer 318 which is disposed over the portion of the pinned layer structure 304 at the ABS. However, the ferromagnetic stitch layer structure 330 is separated and electrically isolated from the free layer 318 by the remaining portion of the insulation layer 328 as illustrated. As shown in FIG. 3E, the ferromagnetic stitch layer structure 330 includes a first stitch layer 340, a second stitch layer 342 and an antiparallel coupling layer 344 therebetween. The antiparallel coupling layer 344 preferably induces the magnetic orientations of the stitch layers 340, 342 to an antiparallel orientation, relative to one another. Moreover, according to different approaches, the construction of the antiparallel coupling layer 344 may include any of the approaches described and/or suggested above with reference to nonmagnetic layer 308.

With continued reference to FIG. 3E, an antiferromagnetic layer 332 is deposited over the ferromagnetic stitch layer structure 330. The geometric volume of the antiferromagnetic layer 332 affects its own thermal stability. Therefore, depending on the desired embodiment, the dimensions of the antiferromagnetic layer 332 in the plane and/or perpendicular to the plane represented by the throat-view cross section shown in FIG. 3E may be chosen (e.g., tuned), preferably during design. According to various approaches, the dimensions of the antiferromagnetic layer 332 may be chosen by a user, a designer, a computer program, using calculations, etc.

Furthermore, a dielectric refill 334 is also shown as being deposited over the antiferromagnetic layer 332 and the remaining insulation layer 328. Both the stitch layer structure 330, and antiferromagnetic layer 332 may be deposited, for example, using directional or collimated vapor deposition source such as ion beam deposition (IBD), e.g., to limit deposition of conducting material on the sidewall. The ferromagnetic stitch layer structure 330 and the antiferromagnetic layer 332 are also deposited over the remaining insulation layer 328 that is disposed over the mask layer 322.

According to various approaches, the first and/or second stitch layers 340, 342 may include one or more magnetic material such as CoFe, Co, CoHf, CoZr, CoFeB, etc., and/or combinations thereof. In further approaches, either of the first and/or second stitch layers 340, 342 may include the same and/or similar materials as the first and/or second pinned layers 306, 310, but are not limited thereto. It should be noted that in different embodiments, the first and second stitch layers 340, 342 may include the same, similar or different materials and/or dimensions. Moreover, the antiferromagnetic layer 332 may include materials such as platinum, iridium, rhodium, nickel, iron, manganese, etc., and/or combinations thereof.

Figure 3F:
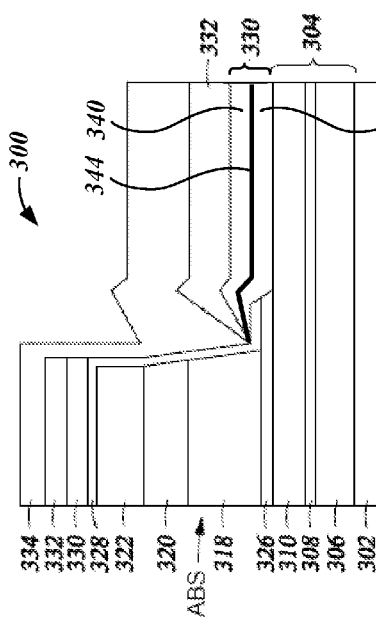

Looking now to FIG. 3F, the mask layer 322 and the layers disposed over the mask layer 322 are removed and the dielectric refill 334 is planarized to be planar with the capping layer 320.

As shown in FIG. 3F, an end of the antiferromagnetic layer 332 in addition to the first and second stitch layers 340, 342 of the ferromagnetic stitch layer structure 330 facing an ABS (also referred to as the sensing face) of the device, e.g., the side of the device that will face the medium or sample to be sensed, are recessed from the ABS. Thus neither the antiferromagnetic layer 332 nor the ferromagnetic stitch layer structure 330 effectively contribute to the thickness of the read gap, which may result in improved reading accuracy, decreased read errors, etc.

As mentioned above, the stitch layer structure 330 includes a first stitch layer 340, a second stitch layer 342 and a nonmagnetic layer 344 therebetween. Referring still to FIG. 3F, the first stitch layer 340 is preferably exchange coupled with the antiferromagnetic layer 332. Thus, according to one approach, the first stitch layer 340 may have a magnetic orientation substantially parallel to a magnetic orientation of the antiferromagnetic layer 332, i.e., oriented in substantially the same direction, and preferably within 5 degrees of each other, but could be higher or lower depending on the desired embodiment. The arrows within layers 306, 310, 340, 342 and 344 of FIG. 3F denote exemplary magnetic orientations.

Furthermore, the second stitch layer 342 is preferably exchange coupled with the first stitch layer 340, such that the second stitch layer 342 has a magnetic orientation substantially antiparallel to the magnetic orientation of the first stitch layer 340. The pinned layer structure 304 is exchange coupled with the second stitch layer 342. Looking to FIG. 3F, the magnetic orientation of the various layers of the device 300 is represented by the arrows within the respective layers. It should be noted that the magnetic orientation of the layers (e.g., directional orientation of the arrows) should not be deemed to be limiting in view of the various embodiments described herein, but rather are included to illustrate the functionality of the present embodiment.

As illustrated in FIG. 3F, according to one embodiment, the free layer 318 may be disposed over a first portion of the pinned layer structure 304 and the ferromagnetic stitch layer structure 330 is disposed over a second portion of the pinned layer structure 304. The remaining spacer layer 326 is disposed above at least a portion of the first and second portions of the pinned layer structure 304, and the free layer 318 is disposed above a first portion of the remaining spacer layer 326. A portion of the remaining insulation layer 328 is disposed over a second portion of the remaining spacer layer 326, and a portion of the ferromagnetic stitch layer 330 is disposed over that portion of the remaining insulation layer 328.

Figure 6E:
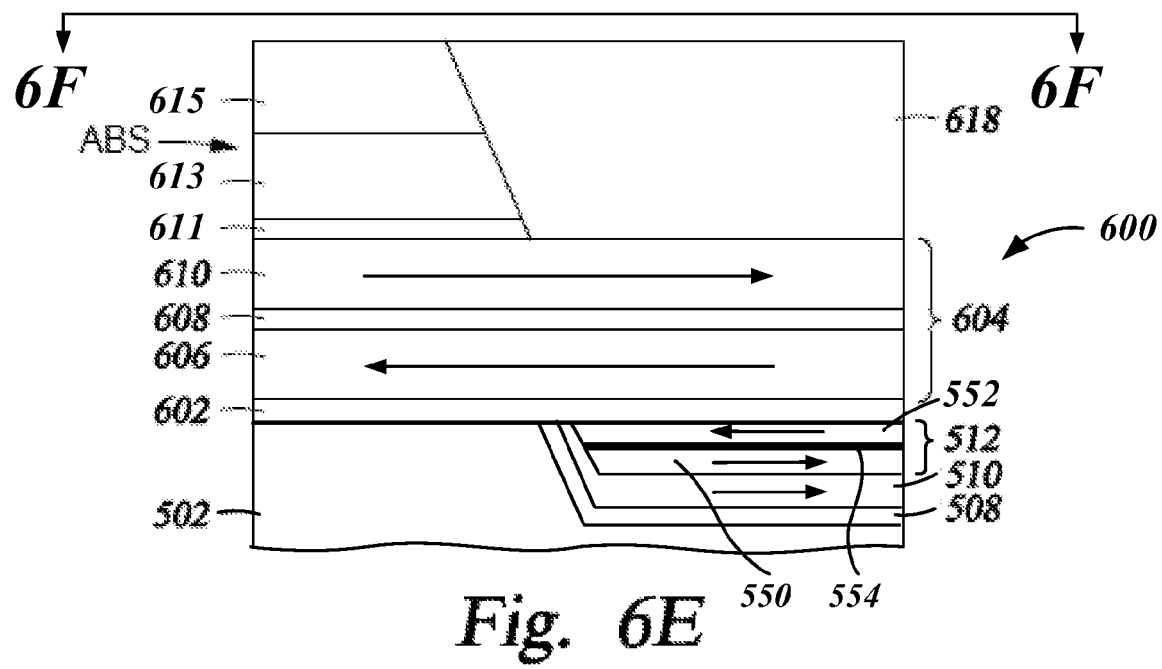
Figure 6F:
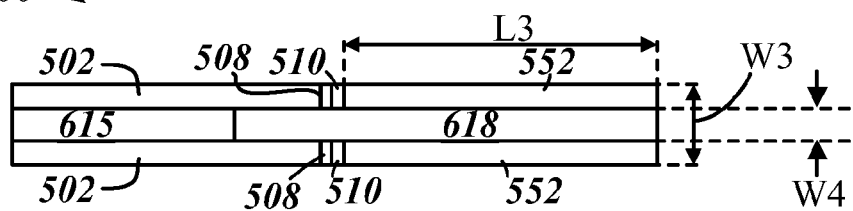
FIG. 6F is a top-down view of the magnetic read head illustrated in FIG. 6E taken along line 6F-6F.

According to a preferred embodiment, which is in no way intended to limit the invention, one or more of the dielectric refill 334, the antiferromagnetic layer 332, ferromagnetic stitch layer structure 330, and second portion of the pinned layer structure 304 are wider than the capping layer 320, free layer 318, remaining spacer layer 326, and the pinned layer structure 304 (e.g., see FIG. 6F). According to the present description, the widths are oriented parallel to planes of deposition of the respective layers and parallel to the ABS (e.g., sensing face) of the device. Therefore, in one approach, the width of at least one of the stitch layers may be greater than a width of the free layer. Moreover, the width of at least one of the stitch layers may be greater than a width of the pinned layer structure.

Referring again to the embodiment illustrated in FIG. 3F, the second stitch layer 342 is positioned above the one of the pinned layers positioned farthest from the free layer, e.g., the first pinned layer 306. Furthermore, the second stitch layer 342 is exchange coupled with the second pinned layer 310, e.g., which is positioned closer to the free layer 318 than the first pinned layer 306. However, in other embodiments, the stitch layer structure 330 may have different orientations with respect to the pinned layers 306, 310. Thus, looking to FIGS. 4A-4F, in one embodiment the second stitch layer 342 may be exchange coupled with the first pinned layer 306 while also being positioned above the first pinned layer 306.

FIGS. 4A-4F illustrate the process of making a device 400, e.g., the magnetic read head 211 of FIG. 2, according to one embodiment. As an option, the present device 400 may be implemented in conjunction with features from any other embodiment listed herein, such as those described with reference to the other Figures. Of course, however, such device 400 and others presented herein may be used in various applications and/or in permutations which may or may not be specifically described in the illustrative embodiments listed herein. Further, the device 400 presented herein may be used in any desired environment. Thus FIGS. 4A-4F (and the other Figures) should be deemed to include any and all possible permutations.

It should be noted that the embodiment illustrated in FIGS. 4A-4F depicts a variation of the embodiment of FIGS. 3A-3F. Specifically, the stitch layer structure 330 has a different orientation with respect to one or more of the layers in the pinned layer structure 304 as will soon become apparent. Accordingly, various components of FIGS. 4A-4F have common numbering with those of FIGS. 3A-3F. Thus, according to various approaches, the components of FIGS. 4A-4F may include any of the embodiments described above with respect to the components of FIGS. 3A-3F having common numbering therewith.

Figure 4A:
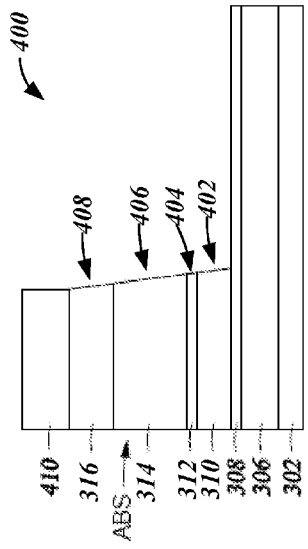
FIGS. 4A-4F are process steps for making a magnetic read head according to one embodiment.
Figure 4B:
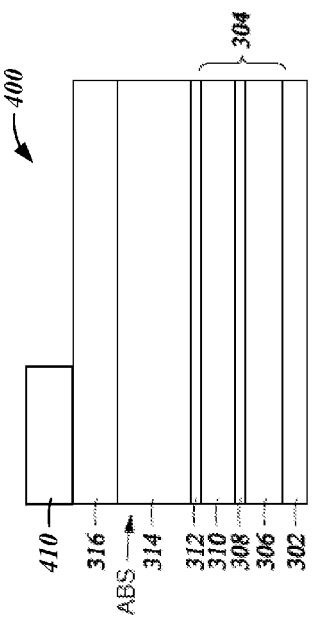

Referring now to FIG. 4A, a device 400 having the same and/or similar layers as described in FIG. 3A is depicted. Additionally, a mask layer 410 is deposited over a portion of the capping layer 316, thereby leaving a portion of the capping layer 316 away from the ABS exposed. Furthermore, looking to FIG. 3B, the exposed portion of the capping layer 316, a portion of the free layer 314, the spacer layer 312 and the second pinned layer 310 not covered by the mask layer 410 are removed, exposing a portion of the nonmagnetic layer 308. As a result, a capping layer 408, a free layer 406, a spacer layer 404 and a second pinned layer 402 are defined. According to various approaches, the removal of the portions of the layers may be performed by one or more ion milling processes as would be appreciated by one skilled in the art upon reading the present description. Moreover, as illustrated, the side wall of the capping layer 408, the free layer 406, the spacer layer 404 and the second pinned layer 402 opposite the ABS may be slightly non-vertical, as the result of the ion milling process.

Figure 4D:
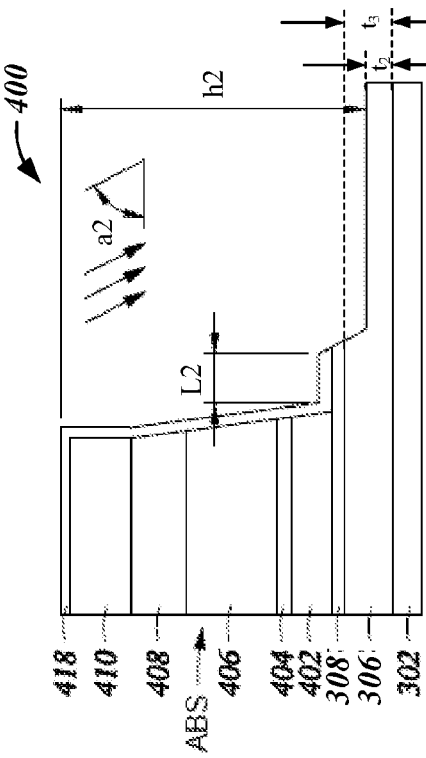
Figure 4F:
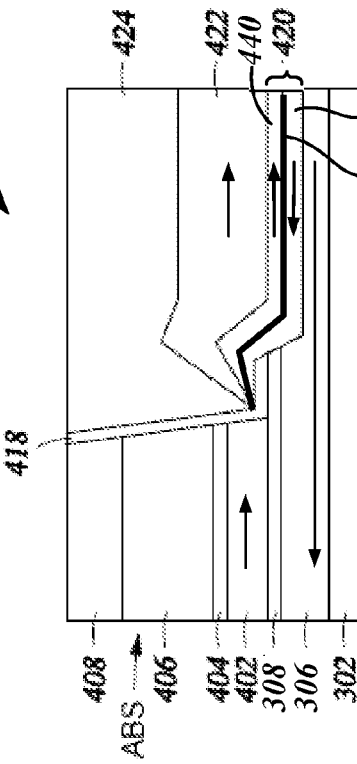
Figure 4C:
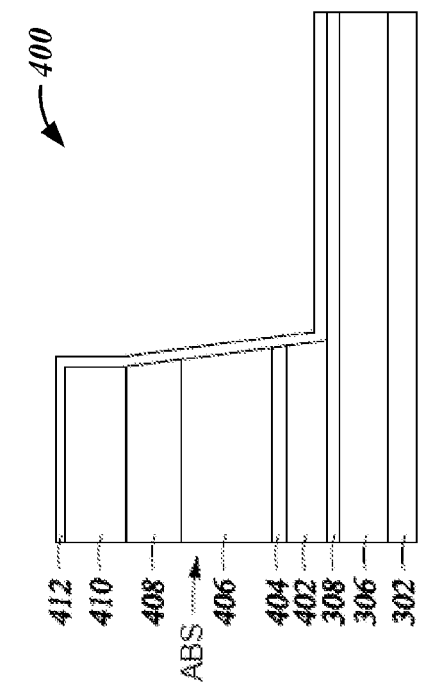

As shown in FIG. 4C, an insulation layer 412 is deposited over the mask layer 410, the exposed portion of the nonmagnetic layer 308, the side wall of the mask layer 410, the capping layer 408, the free layer 406, the spacer layer 404, and the second pinned layer 402, away from the ABS. According to different approaches, the insulation layer 412 may include an insulating material, e.g., MgO, alumina, etc.

Looking to FIG. 4D, a portion of the insulation layer 412, nonmagnetic layer 308, and first pinned layer 306 are removed to expose a portion of the first pinned layer 306, preferably such that the exposed portion of the first pinned layer 306 is away from the ABS. The removal may be performed by an oblique angle static ion mill. A remaining insulation layer 418 has a portion having a length "L2" that is disposed over a remaining nonmagnetic layer 308. The length "L2" approximately equals the thickness "h2" divided by the tangent of the angle "a2", where "a2" is the ion milling angle. The remaining first pinned layer 306 has a first portion at the ABS having a first thickness "$t_2$" in the direction of deposition and an exposed portion away from the ABS having a second thickness "$t_3$" in the direction of deposition. According to the embodiment illustrated in FIG. 4D, the second thickness "$t_3$" is less than the first thickness "$t_2$", but is not limited thereto.

Looking now to FIG. 4E, a ferromagnetic stitch layer structure 420, includes a first stitch layer 440, a second stitch layer 442 and an antiparallel coupling layer 444 therebetween, According to one approach, the second stitch layer 442 may be exchange coupled with the first pinned layer 306 while also being positioned above the first pinned layer 306 as will be described in further detail below.

Figure 4E:
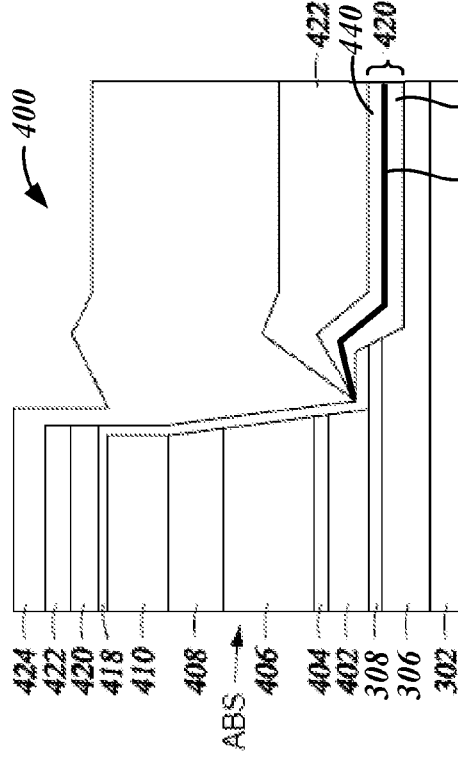

According to the embodiment illustrated in FIG. 4E, the stitch layer structure 420 is deposited over the remaining insulation layer 418, the exposed portion of the first pinned layer 306 and the side wall of the remaining insulation layer 418, and the remaining nonmagnetic layer 308. The antiparallel coupling layer 444 preferably induces the magnetic orientations of the stitch layers 440, 442 to the antiparallel orientation. Moreover, according to different approaches, the antiparallel coupling layer 444 may include any of the approaches described and/or suggested above with reference to nonmagnetic layer 308 and/or antiparallel coupling layer 344.

Furthermore, an antiferromagnetic layer 422 is deposited over the ferromagnetic stitch layer structure 420 such that the ferromagnetic stitch layer structure 420 and the antiferromagnetic layer 422 are also deposited over the remaining insulation layer 418 that is disposed over the mask layer 410. According to one approach, both the antiferromagnetic layer 422 and the stitch layer structure 420 may be deposited using directional ion beam deposition (IBD). The ferromagnetic stitch layer structure 420 may include a magnetic material, e.g., CoFe, but is not limited thereto. Moreover, the antiferromagnetic layer 422 may include materials such as platinum, iridium, rhodium, nickel, iron, manganese, etc., and/or combinations thereof, depending on the desired embodiment. With continued reference to FIG. 4E, a dielectric refill 424 is deposited over the antiferromagnetic layer 422 and the remaining insulation layer 418.

Looking to FIG. 4F, the mask layer 410 and the layers disposed over the mask layer 410 are removed and the dielectric refill 424 is planarized, preferably to be planar with the capping layer 408. As shown, the antiferromagnetic layer 422 and the ferromagnetic stitch layer structure 420 are recessed from the ABS, thus not contributing to the thickness of the read gap.

As mentioned above, the second stitch layer 442 may be exchange coupled with the first pinned layer 306 while also being positioned above the first pinned layer 306. Thus, the second stitch layer 442 preferably has a magnetic orientation substantially parallel to the magnetic orientation of the first pinned layer 306. Moreover, the first pinned layer 306 is exchange coupled to the second pinned layer 402, e.g., such that the magnetic orientation of the first pinned layer 306 is substantially antiparallel to the magnetic orientation of the second pinned layer 402. Looking to FIG. 4F, the magnetic orientation of the various layers of the device 300 is represented by the arrows within the respective layers. It should be noted that the magnetic orientation of the layers (e.g., directional orientation of the arrows) should not be deemed to be limiting in view of the various embodiments described herein, but rather are included to illustrate the functionality of the present embodiment.

According to the illustrative embodiment illustrated in FIG. 4F, the nonmagnetic layer 308 is disposed over a first portion of the remaining first magnetic layer 306, and the second pinned layer 402 is disposed over a first portion of the nonmagnetic layer 308. Furthermore, a portion of the insulation layer 418 is disposed over the second portion of the nonmagnetic layer 308, and the ferromagnetic stitch layer structure 420 is disposed over the second portion of the remaining first magnetic layer 306 and the portion of the insulation layer 418 that is disposed over the second portion of the nonmagnetic layer 308.

According to one embodiment, which is in no way intended to limit the invention, one or more of the dielectric refill 424, antiferromagnetic layer 422, ferromagnetic stitch layer structure 420, and second portion of the remaining first magnetic layer 306 are wider in the trackwidth direction than the capping layer 408, free layer 406, spacer layer 404, and second pinned layer 402 (e.g., see FIG. 6F). As described above, the widths are oriented parallel to planes of deposition of the respective layers and parallel to the ABS (e.g., sensing face) of the device. Moreover, according to various approaches, the dimensions of the layers of FIGS. 4A-4F may include any of those described herein for similar and/or the same layer types.

Although FIGS. 3A-3F and 4A-4F illustrate processes of making devices, e.g., magnetic read heads having a recessed antiferromagnetic layer that is top stitched, meaning the antiferromagnetic layer is disposed over the ferromagnetic stitch layer, alternatively, a device may have a recessed antiferromagnetic layer that is bottom stitched. Thus, according to different embodiments, the antiferromagnetic layer of a device may be disposed under the ferromagnetic stitch layer, as will soon become apparent.

FIGS. 5A-5H illustrate the process of making a device 500 having a bottom stitched recessed antiferromagnetic layer according to one embodiment. As an option, the present device 500 may be implemented in conjunction with features from any other embodiment listed herein, such as those described with reference to the other Figures. Of course, however, such device 500 and others presented herein may be used in various applications and/or in permutations which may or may not be specifically described in the illustrative embodiments listed herein. Further, the device 500 presented herein may be used in any desired environment. Thus FIGS. 5A-5H (and the other Figures) should be deemed to include any and all possible permutations.

As shown in FIG. 5A, a mask layer 504 is disposed over a portion of a shield 502, and a portion of the shield 502 not covered by the mask layer 504 is removed by an ion milling process, forming a trench 506 in the shield 502 away from the ABS. Furthermore, a seed layer 508 is deposited over the mask layer 504 and into the trench 506, as shown in FIG. 5B. The seed layer 508 may include Ta, Ru, etc. Furthermore, an antiferromagnetic layer 510 is deposited over the seed layer 508, and a ferromagnetic stitch layer structure 512 is deposited over the antiferromagnetic layer 510. As illustrated, the ferromagnetic stitch layer structure 512 includes a first stitch layer 550, a second stitch layer 552 and an antiparallel coupling layer 554 therebetween.

According to one approach, the first and/or second stitch layers 550, 552 of the ferromagnetic stitch layer structure 512 may include a magnetic material, e.g., NiFe, CoFe, CoFeB, Co, CoZr, CoHf, CoFeTaB, etc., and/or combinations thereof. The antiferromagnetic layer 510 may include materials such as platinum, iridium, rhodium, nickel, iron, manganese, etc., and/or combinations thereof. The mask layer 504 and the layers disposed over the mask layer 504 may be removed by a liftoff process, leaving a structure as shown in FIG. 5C.

Looking to FIG. 5D, a mask layer 514 is deposited over the seed layer 508, the antiferromagnetic layer 510 and the ferromagnetic stitch layer structure 512. A second trench 516 is formed by removing a portion of the shield 502 not covered by the mask layer 514, e.g., using an ion milling process. The second trench 516 extends from the (future) ABS to the seed layer 508, antiferromagnetic layer 510 and ferromagnetic stitch layer structure 512.

A second seed layer 518 is deposited into the second trench 516, and the mask 514 is removed, as shown in FIG. 5E. According to various approaches, the second seed layer 518 may include Ta, Ru, etc., and/or combinations thereof. In a further approach, the second seed layer 518 may be a layered stack.

As shown in FIG. 5F, a pinned layer structure 520 may be deposited over the second seed layer 518, the seed layer 508, the antiferromagnetic layer 510 and the ferromagnetic stitch layer structure 512. Preferably, the pinned layer structure 520 is an AP pinned layer structure having a first pinned layer 522, a second pinned layer 526, and a nonmagnetic AP coupling layer 524 sandwiched between the first and second pinned layers 522, 526. The first and second pinned layers 522, 526 may be constructed of magnetic materials such as, NiFe, CoFe (e.g., 25% Fe), Co, CoFeB, CoZr, CoHf, CoFeTaB, etc., and/or combinations thereof. In further approaches, one or both of the pinned layers 522, 526 may have a single layer or be a laminate, e.g., which may include nickel-iron. The nonmagnetic layer 524 may include Ru, or other known AP coupling material.

According to a preferred approach, the second stitch layer 552 may be exchange coupled with the first pinned layer 522 while also being positioned below the first pinned layer 522. Thus, the first pinned layer 522 preferably has a magnetic orientation that is substantially parallel to that of the second stitch layer 552 as will be discussed in further detail below (e.g., see FIG. 5H). Also preferably, the second stitch layer 552 is in direct physical contact with the first pinned layer 522, though an intervening layer may be present if magnetic and/or thin enough to not substantially interfere with the exchange coupling.

With continued reference to FIG. 5F, according to the exemplary embodiment illustrated, the first pinned layer 522 is in contact with the second seed layer 518 and the ferromagnetic stitch layer structure 512. On the trench sidewall, the first pinned layer 522 is also in contact with the seed layer 508 and the antiferromagnetic layer 510. Again, an intervening layer may be present.

Deposited over the pinned layer structure 520 is a spacer layer 528. In various approaches, the spacer layer 528 may include an insulating material, e.g., MgO, $TiO_2$, alumina, etc.; a metallic material, e.g., Cu, Ag, AgSn, etc.; etc. A free layer 530 is also deposited above the spacer layer 528.

According to various approaches, which is in no way intended to limit the invention, in a tunneling magnetoresistance (TMR) sensor, the pinned layer structure is a tunnel barrier layer of a type known in the art, e.g., of magnesium oxide, $TiO_2$, alumina or other known tunnel barrier material. In other embodiments, the spacer layer 312 may be a nonmagnetic metallic spacer layer, e.g., of Cu, Ag, AgSn, etc. Metallic spacer layers may be used, for example, in current perpendicular to plane (CPP) sensors such as GMR sensors, AMR sensors, etc.

In various approaches, the free layer 314 may include a conventional ferromagnetic material such as Co, CoFe, CoFeB, NiFe, CoHf, etc. and/or combinations thereof. Furthermore, the capping layer 532 may be a single layer or a multilayered structure which may include a material such as Ru, Ta, etc., e.g., to protect the layers of the device 500 below the capping layer 532 from oxidation and other damage.

Looking to FIG. 5G, a portion of the capping layer 532, the free layer 530, and the spacer layer 528 are removed by etching, e.g., to expose a portion of the pinned layer structure 520 that is away from the ABS. According to one approach, the removal of the portion of the capping layer 532, the free layer 530, and the spacer layer 528 may be performed using an ion milling process, or other subtractive process known in the art.

It should be noted that testing revealed that, beneficially, no milling/etching damage was found in the antiferromagnetic layer 510 after performing the foregoing subtractive process. The multilayered configuration of the stitch layer structure 512 is believed to prevent such damage from extending to the antiferromagnetic layer 510. Such result may be dependent on etch exposure times.

Figure 7A:
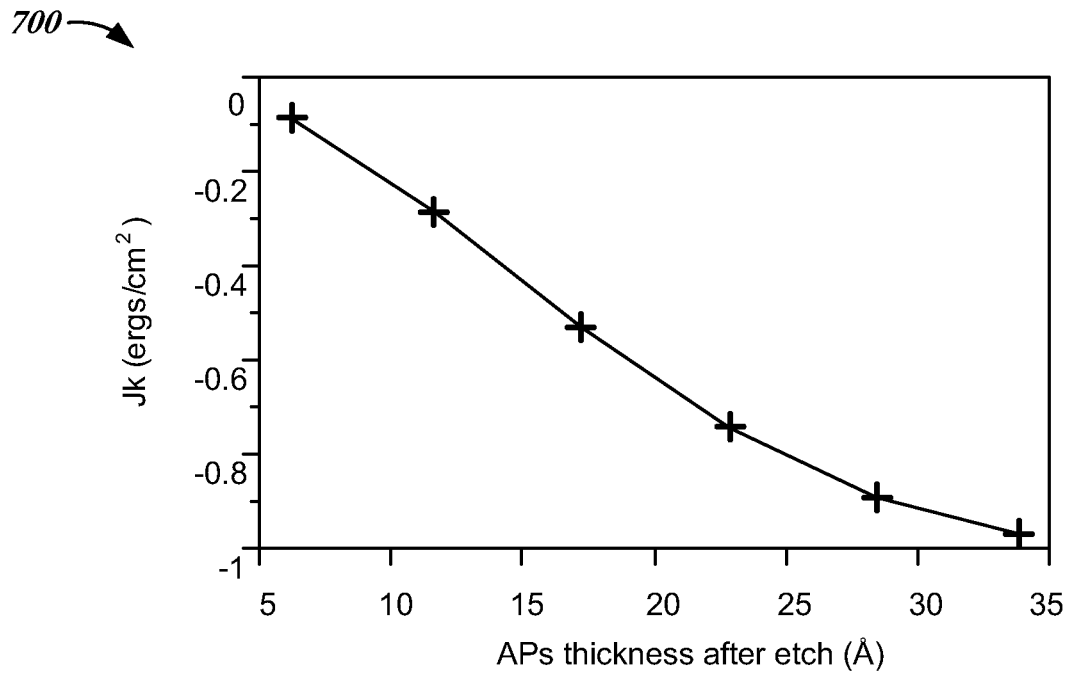
FIG. 7A is a graph illustrating the relationship between the pinning energy and the thickness of a single layered pinned layer according to one embodiment.
Figure 7B:
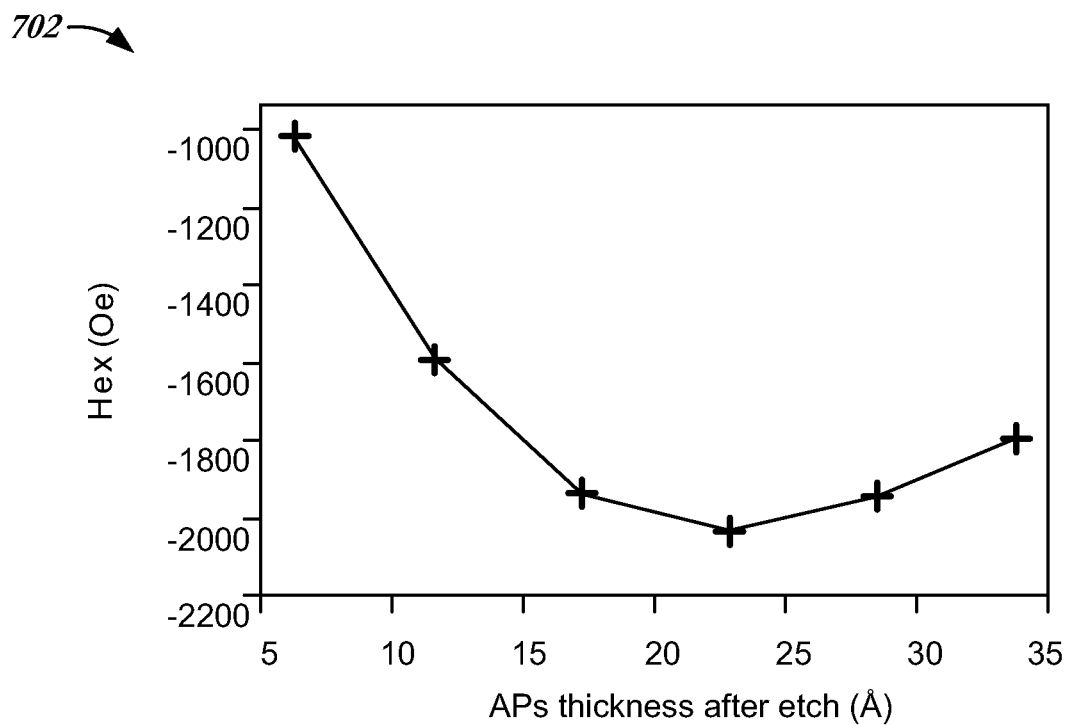
FIG. 7B is a graph illustrating the relationship between the pinning field and the thickness of a single layered pinned layer according to one embodiment.

As illustrated in FIG. 7A, the graph 700 depicts the effects of etching on the pinning field $J_k$. By increasing the amount of time an AP layer is exposed to etching, such that the thickness of the pinned layer decreases, the pinning field $J_k$ drastically decreases as well. Moreover, looking to FIG. 7B, the graph 702 illustrates that as the pinning energy decreases, the resulting pinning field decreases as well. Similar to the pinning field, as the etch times increase such that the thickness of the pinned layer decreases, the magnetic field $H_{ex}$ begins to drop, which unfavorably results in the pinning of the magnetic orientation of the pinned layer(s) to weaken, potentially to the point that the magnetic orientation of a magnetic medium being read and/or written to may flip the magnetic orientation of the pinned layers, and possibly the free layer. This may in turn result in decreased performance, increased data loss, increased error rate, and possibly an inoperative sensor.

Figure 8:
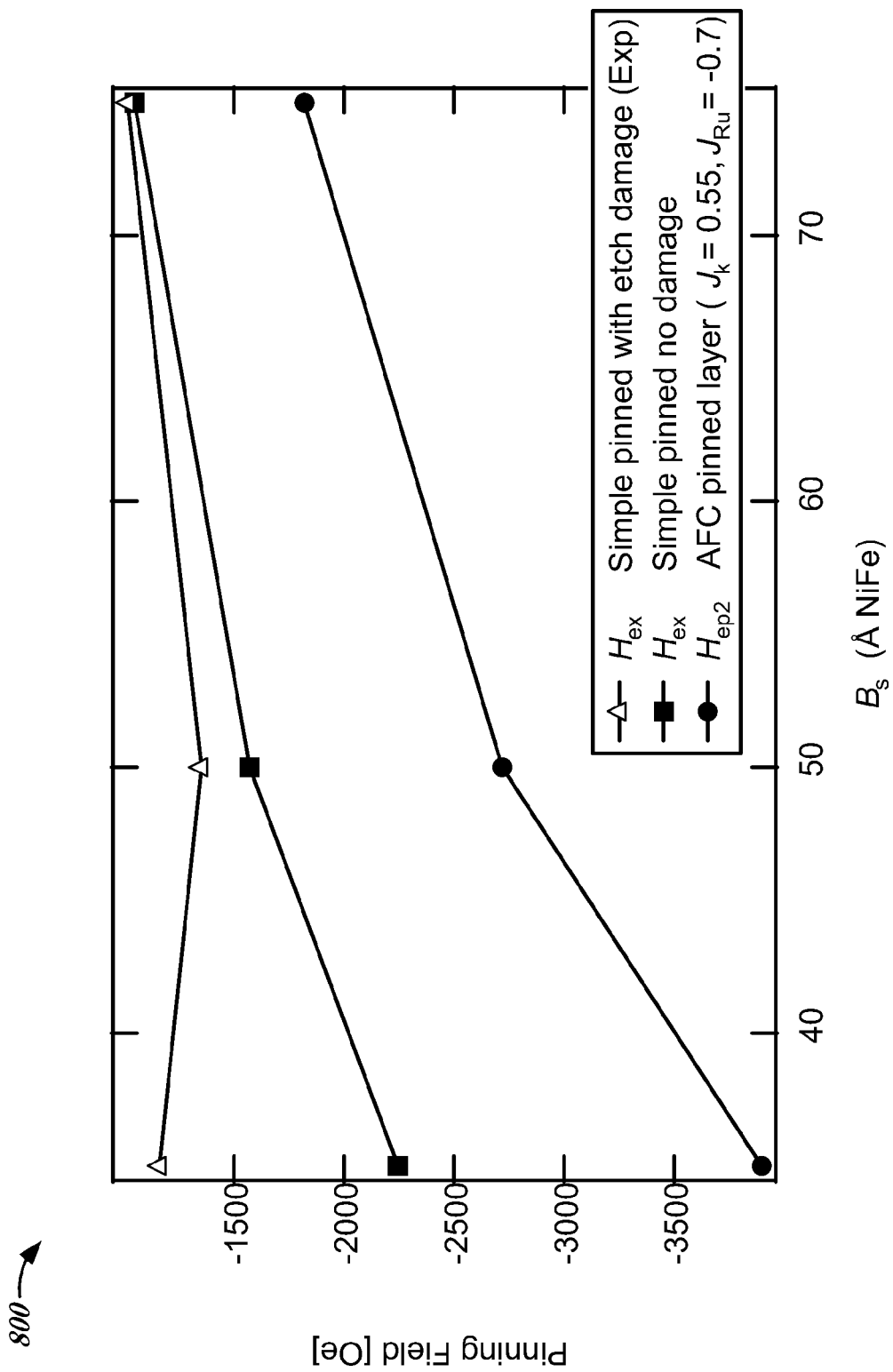
FIG. 8 is a graph illustrating the relationship between the pinning field and the thickness of layers for several different embodiments.

However, in sharp contrast, with reference to the graph 800 of FIG. 8, the multilayer stitch layer structure (e.g., 512 of FIGS. 5B-5H) provides increased pinning field strength. Looking to FIG. 8, modeling of an antiferromagnetic coupled (AFC) pinned layer, having a multilayered stitch layer structure, results in a pinning field strength that is much stronger than the simple pinned structures which did not include an improved stitch layer structure. Moreover, it should be noted that experimentation was conducted by the inventors on the simple pinned structures under the same conditions as for the AFC pinned layer.

Looking to the results presented in graph 800 of FIG. 8, it is apparent that the pinning field strength is greatly increased as the milling damage, e.g., from processes steps for forming a read sensor structure having an improved multilayer stitch layer structure (e.g., see FIGS. 5A-6F), is prevented from extending to the antiferromagnetic layer. Thus, various embodiments described and/or suggested herein may increase the pinning field strength of a device, e.g., magnetic read head.

Referring again to FIG. 5H, as illustrated, a dielectric refill 540 may be deposited over the exposed portion of the pinned layer structure 520 and over the side wall of the capping layer 532, the free layer 530 and the spacer layer 528. According to an exemplary embodiment which is in no way intended to limit the invention, one or more of the dielectric refill 540, antiferromagnetic layer 510, and ferromagnetic stitch layer structure 512 are preferably wider in the trackwidth direction than the capping layer 538, free layer 536, and spacer layer

534 (e.g., see FIG. 6F). As described above, the widths are oriented parallel to planes of deposition of the respective layers and parallel to the ABS (e.g., sensing face) of the device. Moreover, according to various approaches, the dimensions of the layers of FIGS. 5A-5F may include any of those described herein for similar and/or the same layer types.

As mentioned above, the second stitch layer 552 may be exchange coupled with the first pinned layer 522 while also being positioned below the first pinned layer 522. Thus, the second stitch layer 552 preferably has a magnetic orientation substantially parallel to the magnetic orientation of the first pinned layer 522. Moreover, the first pinned layer 522 is exchange coupled to the second pinned layer 526, e.g., such that the magnetic orientation of the first pinned layer 522 is substantially antiparallel to the magnetic orientation of the second pinned layer 526. Looking to FIG. 5F, the magnetic orientation of the various layers of the device 500 is represented by the arrows within the respective layers. It should be noted that the magnetic orientation of the layers (e.g., directional orientation of the arrows) should not be deemed to be limiting in view of the various embodiments described herein, but rather are included to illustrate the functionality of the present embodiment.

FIGS. 6A-6E illustrate the process of making a device 600, e.g., a magnetic read head according to yet another embodiment. As an option, the present device 600 may be implemented in conjunction with features from any other embodiment listed herein, such as those described with reference to the other Figures. Of course, however, such device 600 and others presented herein may be used in various applications and/or in permutations which may or may not be specifically described in the illustrative embodiments listed herein. Further, the device 600 presented herein may be used in any desired environment. Thus FIGS. 6A-6E (and the other Figures) should be deemed to include any and all possible permutations.

As shown in FIG. 6A, the structure shown in FIG. 5C has been reproduced to illustrate a variation of the embodiment of FIGS. 5A-5H. Accordingly, various components of FIGS. 6A-6F have common numbering with those of FIGS. 5A-5H.

Referring now to FIG. 6B, a nonmagnetic layer 602 is deposited over the shield 502, the seed layer 508, the antiferromagnetic layer 510 and the ferromagnetic stitch layer structure 512. According to the embodiment depicted in FIGS. 6A-6F, the nonmagnetic layer 602 is shown as being in contact with the shield 502, the seed layer 508, the antiferromagnetic layer 510 and the ferromagnetic stitch layer structure 512.

The nonmagnetic layer 602 may include Ru, but is not limited thereto. According to another approach, the nonmagnetic layer 602 may include a platinum group metal such as Ru, Ir, Pt, Os, Rh, Pd, etc. Moreover, in different approaches, the nonmagnetic layer 602 may have a deposition thickness from about 1 nm to about 2 nm, but could be higher or lower depending on the desired embodiment.

Looking to FIG. 6C, a pinned layer structure 604 is deposited over the nonmagnetic layer 602. According to the embodiment illustrated, the pinned layer structure 604 may be an AP pinned structure having a first pinned layer 606, a second pinned layer 610, and a nonmagnetic AP coupling layer 608 sandwiched between the two pinned layers 606, 610. According to various approaches, the first and/or second pinned layers 606, 610 may be constructed of several magnetic materials such as, for example NiFe, CoFe, CoFeB, Co, CoZr, CoHf, CoFeTaB, etc., and/or combinations thereof. It should be noted that in different embodiments, the first and second pinned layers 606, 610 may include the same, similar or different materials and/or dimensions. Furthermore, the nonmagnetic layer 608 preferably includes Ru, or other known AP coupling layer.

With continued reference to FIG. 6C, a spacer layer 611 is deposited above the pinned layer structure 604, a free layer 613 is deposited above the spacer layer 611, and a capping layer 615 is deposited above the free layer 613. In various approaches, the various layers 611, 613, 615 may have the same or similar construction and/or composition as in other embodiments having layers of the same name.

A portion of the capping layer 615, the free layer 613, and the spacer layer 611 are shown as being removed in FIG. 6D, e.g., to expose a portion of the pinned layer structure 604 that is away from the ABS. As described above in reference to FIGS. 5A-5H, the portion of the capping layer 615, the free layer 613, and the spacer layer 611 may be removed using an ion milling process or other conventional subtractive process.

Additionally, a dielectric refill 618 is disposed over the exposed portion of the pinned layer structure 604 and over the side wall of the capping layer 615, the free layer 613 and the spacer layer 611, as shown in FIG. 6E. The first stitch layer 550 is preferably exchange coupled with the antiferromagnetic layer 510. Thus, according to one approach, the first stitch layer 550 may have a magnetic orientation substantially parallel to a magnetic orientation of the antiferromagnetic layer 510, i.e., oriented in substantially the same direction, and preferably within 5 degrees of each other, but could be higher or lower depending on the desired embodiment.

Furthermore, the second stitch layer 552 is shown as being exchange coupled with the pinned layer 606 positioned farthest from the free layer 613 such that the second stitch layer 552 is positioned below the pinned layer 606 positioned farthest from the free layer. In other words, the second stitch layer 552 may be exchange coupled with the first stitch layer 550, such that the second stitch layer 552 has a magnetic orientation substantially antiparallel to the magnetic orientation of the first stitch layer 550. The pinned layer structure 604 is also exchange coupled with the second stitch layer 552. Looking to FIG. 6E, the magnetic orientation of the various layers of the device 600 is represented by the arrows within the respective layers. It should be noted that the magnetic orientation of the layers (e.g., directional orientation of the arrows) should not be deemed to be limiting in view of the various embodiments described herein, but rather are included to illustrate the functionality of the present embodiment.

Referring now to FIG. 6F, according to a preferred approach as explained in other embodiments above, the width W3 of the antiferromagnetic layer 510, and ferromagnetic stitch layer structure (e.g., second stitch layer 552 shown) is wider in the trackwidth direction than the width W4 of the capping layer 615, free layer, and spacer layer. As illustrated, the widths are oriented parallel to planes of deposition of the respective layers and parallel to the ABS (e.g., sensing face) of the device. Furthermore, the length "L3" of the ferromagnetic stitch layer structure 512, and/or the length of the antiferromagnetic layer 510, may be from about 200 nm to about 300 nm, but could be higher or lower depending on the desired embodiment. As described above, the dimensions of the various components of the device 600 may be chosen (e.g., tuned), preferably during design, e.g., by a user, a designer, a computer program, using calculations, etc., depending on the desired embodiment According to various approaches, the dimensions of the layers of FIGS. 6A-6F may include any of those described herein for similar and/or the same layer types. Moreover, such device 600 and the dimensions of its various components may be used in various applications and/or in permutations which may or may not be specifically described in the illustrative embodiments listed herein. Thus, the dimensions of the various components in device 600 may be used in any desired environment.

Various embodiments herein may reduce the damage done to an antiferromagnetic layer of an exemplary magnetic read head, caused by a milling process, such that at least damage from milling that causes degradation of the pinning field is not detectable in the antiferromagnetic layer by any known testing technique. Preferably, any damage to the antiferromagnetic layer due to the milling in general is not detectable in the antiferromagnetic layer by any known technique. Thus, the multilayered configuration of the stitch layer structure 512 of FIGS. 6A-6E is believed to prevent the etching damage from extending to the antiferromagnetic layer 510 as described in reference to FIGS. 5A-5H. Again, looking to FIG. 8, the pinning force of a device having a non-damaged antiferromagnetic layer is much higher than that of a device possessing a simple pinned structure subjected to etching damage.

It follows that a magnetic read head having an antiferromagnetic layer recessed from the ABS, in combination with an exchange coupled multilayer stitch layer structure, is desirable in view of the description provided herein. In various embodiments, the antiferromagnetic layer may be top stitched or bottom stitched. Moreover, by recessing the antiferromagnetic layer from the ABS, it does not contribute to the thickness of the read gap, thereby increasing performance and accuracy thereof.

The structures disclosed herein may not be limited for use in a magnetic read head. The structures may be also used in any magnetic device such as all magnetic sensors, MRAM, biological sensors, magnetic recording heads, etc.

It should be noted that methodology presented herein for at least some of the various embodiments may be implemented, in whole or in part, in computer hardware, software, by hand, using specialty equipment, etc. and combinations thereof.

Moreover, any of the structures and/or steps may be implemented using known materials and/or techniques, as would become apparent to one skilled in the art upon reading the present specification.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A device, comprising:
   an antiferromagnetic layer;
   a first stitch layer exchange coupled with the antiferromagnetic layer, the first stitch layer having a magnetic orientation substantially parallel to a magnetic orientation of the antiferromagnetic layer;
   a second stitch layer exchange coupled with the first stitch layer and having a magnetic orientation substantially antiparallel to the magnetic orientation of the first stitch layer;
   a pinned layer structure exchange coupled with the second stitch layer;
   a free layer; and
   a spacer layer between the free layer and the pinned layer structure,
   wherein an end of the antiferromagnetic layer facing a sensing face of the device is recessed from the sensing face,
   wherein a width of at least one of the stitch layers is greater than a width of the free layer,
   wherein the widths are oriented parallel to planes of deposition of the respective layer and parallel to the sensing face of the device.

2. The device as recited in claim 1, wherein ends of the stitch layers facing the sensing face of the device are recessed from the sensing face.

3. The device as recited in claim 1, wherein the pinned layer structure includes at least two pinned layers sandwiching an antiparallel coupling layer.

4. The device as recited in claim 3, wherein the second stitch layer is exchange coupled with one of the pinned layers positioned farthest from the free layer.

5. The device as recited in claim 4, wherein the one of the pinned layers positioned farthest from the free layer is positioned above the second stitch layer relative to a direction of deposition thereof.

6. The device as recited in claim 4, wherein the one of the pinned layers positioned farthest from the free layer is positioned below the second stitch layer relative to a direction of deposition thereof.

7. The device as recited in claim 3, wherein the second stitch layer is exchange coupled with one of the pinned layers positioned closest to the free layer.

8. The device as recited in claim 1, further comprising an antiparallel coupling layer sandwiched between the stitch layers, wherein the antiparallel coupling layer induces the magnetic orientations of the stitch layers to the antiparallel orientation.

9. A magnetic data storage system, comprising:
   at least one device as recited in claim 1;
   a magnetic medium;
   a drive mechanism for passing the magnetic medium over the at least one device; and
   a controller electrically coupled to the at least one magnetic head for controlling operation of the at least one magnetic head.

10. A device,
    comprising:
    an antiferromagnetic layer;
    a first stitch layer exchange coupled with the antiferromagnetic layer, the first stitch layer having a magnetic orientation substantially parallel to a magnetic orientation of the antiferromagnetic layer;
    a second stitch layer exchange coupled with the first stitch layer and having a magnetic orientation substantially antiparallel to the magnetic orientation of the first stitch layer;
    a pinned layer structure exchange coupled with the second stitch layer;
    a free layer; and
    a spacer layer between the free layer and the pinned layer structure,
    wherein an end of the antiferromagnetic layer facing a sensing face of the device is recessed from the sensing face,
    wherein a width of at least one of the stitch layers is greater than a width of the pinned layer structure,
    wherein the widths are oriented parallel to planes of deposition of the respective layer and parallel to the sensing face of the device.

11. A device, comprising:
    an antiferromagnetic layer;
    a first stitch layer exchange coupled with the antiferromagnetic layer, the first stitch layer having a magnetic orientation substantially parallel to a magnetic orientation of the antiferromagnetic layer;

a second stitch layer exchange coupled with the first stitch layer and having a magnetic orientation substantially antiparallel to the magnetic orientation of the first stitch layer;

a pinned layer structure, a portion of the pinned layer being exchange coupled with the second stitch layer, wherein a magnetic orientation of the portion of the pinned layer is substantially parallel with the magnetic orientation of the second stitch layer;

a free layer; and a spacer layer between the free layer and the pinned layer structure, wherein an end of the antiferromagnetic layer facing a sensing face of the device is recessed from the sensing face, wherein ends of the stitch layers facing the sensing face of the device are recessed from the sensing face, wherein a width of at least one of the stitch layers is greater than a width of the free layer, wherein the widths are oriented parallel to planes of deposition of the respective layer and parallel to the sensing face of the device.

12. The device as recited in claim 11, wherein the pinned layer structure includes at least two pinned layers sandwiching an antiparallel coupling layer.

13. The device as recited in claim 12, wherein the second stitch layer is exchange coupled with one of the pinned layers positioned farthest from the free layer.

14. The device as recited in claim 12, wherein the second stitch layer is exchange coupled with one of the pinned layers positioned closest to the free layer.

15. The device as recited in claim 11, wherein a width of at least one of the stitch layers is greater than a width of the pinned layer structure, wherein the widths are oriented parallel to planes of deposition of the respective layer and parallel to the sensing face of the device.

16. The device as recited in claim 11, further comprising an antiparallel coupling layer sandwiched between the stitch layers, wherein the antiparallel coupling layer induces the magnetic orientations of the stitch layers to the antiparallel orientation.

17. The device as recited in claim 11, wherein damage from milling that causes degradation of the pinning field is not detectable in the antiferromagnetic layer.

* * * * *